United States Patent [19]

Fujimoto et al.

[11] Patent Number: 4,769,844
[45] Date of Patent: Sep. 6, 1988

[54] VOICE RECOGNITION SYSTEM HAVING A CHECK SCHEME FOR REGISTRATION OF REFERENCE DATA

[75] Inventors: Junichiroh Fujimoto; Tetsuya Muroi, both of Yokohama, Japan

[73] Assignee: Ricoh Company, Ltd., Tokyo, Japan

[21] Appl. No.: 33,943

[22] Filed: Apr. 3, 1987

[30] Foreign Application Priority Data

Apr. 3, 1986 [JP] Japan .................................. 61-76905

[51] Int. Cl.⁴ .............................................. G10L 5/00
[52] U.S. Cl. ........................................ 381/42; 381/43; 364/513.5
[58] Field of Search ................................... 381/41–43; 364/513.5

[56] References Cited

U.S. PATENT DOCUMENTS

4,078,154  3/1978  Suzuki et al. .......................... 381/42
4,100,370  7/1978  Suzuki et al. .......................... 381/42
4,716,593  12/1987  Hirai et al. ............................ 381/42

Primary Examiner—Vit W. Miska
Attorney, Agent, or Firm—Mason, Fenwick & Lawrence

[57] ABSTRACT

A voice recognition system includes a microphone for converting a voice in the form of pressure waves into an electrical voice signal and a keyboard for inputting the phonetic spelling of the voice. A check mechanism is connected to the keyboard to determine whether or not the voice has a predetermined sound element, which is difficult to be detected, such as /u/, /i/, /n/ and explosives like /p/, /t/, /k/ and /b/, at or near the end thereof. If the check mechanism has determined the presence of such a predetermined sound element, then it checks the corresponding voice pattern to see whether the corresponding component is present in the pattern or not. If not, a warning may be issued to request reinputting of the voice, thereby insuring the fact that the voice pattern to be registered as a reference voice pattern is always accurate.

17 Claims, 9 Drawing Sheets

VOICE RECOGNITION SYSTEM HAVING A CHECK SCHEME FOR REGISTRATION OF REFERENCE DATA

BACKGROUND OF THE INVENTION

1. Field of the Invention

This invention generally relates to voice recognition technologies, and, in particular, to a voice recognition system having a checking scheme for registration of reference voice patterns. More specifically, the present invention relates to a voice recognition system which checks the voice patterns of certain words whose ends are difficult to detect before having the voice patterns registered as reference data.

2. Description of the Prior Art

Various schemes have been developed for recognizing voice information. A typical prior art voice recognition system has a dual mode operation, i.e., registration mode and recognition mode. The system is first set in the registration mode, whereby the user pronounces a plurality of words or characters and the pronounced sounds are stored in the form of voice patterns as reference data. And, then, the system is set in the recognition mode, whereby when the user makes an unknown sound, it is converted into a voice pattern which is then compared with each of the reference pattern data, thereby selecting the one reference pattern data which is most similar to the input unknown sound. In this manner, the input unknown sound can be identified.

Figure 1:
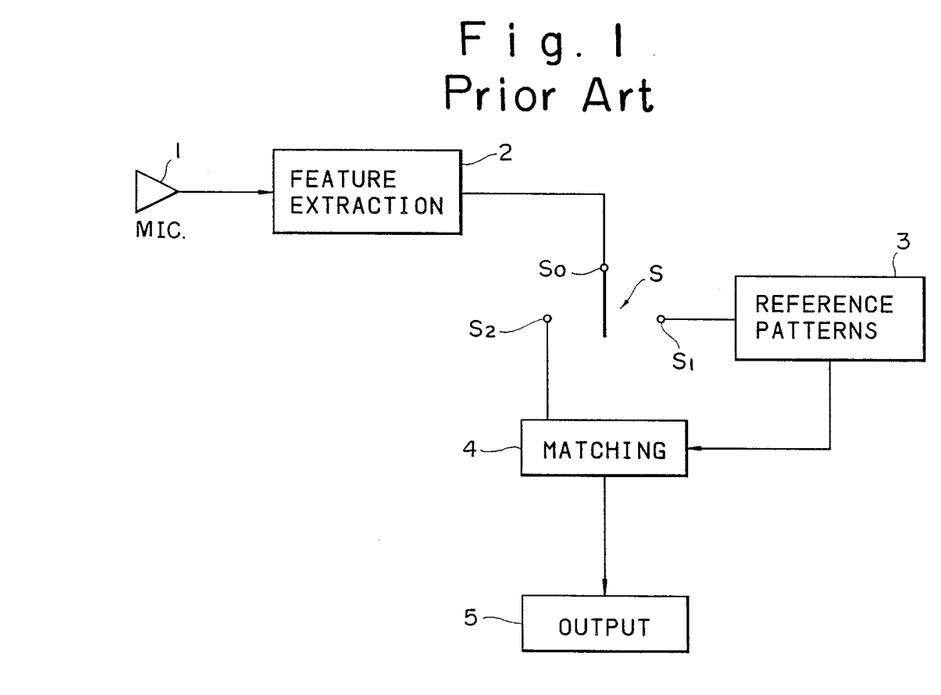
FIG. 1 is a schematic illustration showing partly in blocks the overall structure of a typical prior art dual mode voice recognition system.

FIG. 1 shows a typical prior art sound or voice recognition system which includes a microphone 1 as a transducer for converting a sound or voice in the form of pressure waves into the corresponding electrical signal. The microphone 1 is connected to a feature extractor 2 where the voice electrical signal is subjected to a predetermined processing operation to extract a predetermined feature from the voice electrical signal. Such a feature can be a time-frequency pattern if the voice signal is subjected to frequency analysis using a filter bank, or a LPC coefficient if the voice signal is subjected to LPC analysis. Thus, the feature to be extracted depends on the manner how the voice signal is analyzed. The feature extractor 2 is connected to a common contact point $S_0$ of a selection switch S, which can be connected to either one of a pair of contacts $S_1$ and $S_2$. When the system is to be set in the registration mode, the switch S should be operated to establish a connection between the common contact $S_0$ and the contact $S_1$. Under this condition, the extracted feature of the voice signal is stored in a memory 3 as a reference pattern. This process is repeated as many times as desired to store a desired number of reference patterns in the memory 3.

Then, the system of FIG. 1 is set in the recognition mode by operating the switch S to establish a connection between the common contact $S_0$ and the contact $S_2$. Under this condition, the user makes a sound, for example, by pronouncing a desired word, and this sound is fed into the microphone 1 to be converted into an unknown corresponding voice signal which is then processed by the feature extractor 2, so that the feature of the unknown voice signal is extracted. The feature of this unknown voice signal is then compared with each of the reference data stored in the memory 3 at a matching unit 4, thereby selecting one of the plurality of reference data which is most similar to the feature of the unknown voice signal as a most likely candidate of the unknown sound. Then, this selected reference data is supplied to an output unit 5 to complete the process of recognizing the input unknown sound.

In such a voice recognition system, it is very important to register a reference data as accurately as possible. Otherwise, the rate of recognition cannot be improved no matter how advanced the matching scheme may be. It is often the case that difficulty is encountered in detecting the end of a voiced word. In particular, there are some words whose ends are difficult to detect when pronounced. For example, in the case of Japanese, most of the words ends with a vowel, and vowels /i/ and /u/ are difficult to detect because these vowels are often pronounced softly when placed at the end of a word, and, in some cases, they are almost lost when a word having either one of these vowels at the end is pronounced. Numeral "1" is pronounced "ichi" in Japanese, but the last vowel "i" is pronounced softly and often left out. Similarly, numeral "6" is pronounced "roku" and the last vowel "u" is pronounced very softly and is difficult to detect. The sound for Japanese character /n/ is also pronounced softly and it is often lost if it is placed at the end of a word. On the other hand, in the case of English, if a word ends with an explosive sound, such as "pink" or "stop", or with a particular combination of two or more characters, such as "ck" for "back", then the end of a voiced sound tends to be lost and cannot be detected. The English letters which explosive sounds include "p", "t", "k", "b", "d" and "g", and the combinations of English characters which are difficult to detect when placed at the end of a word include "ch", "ck" and "th."

Figure 12:
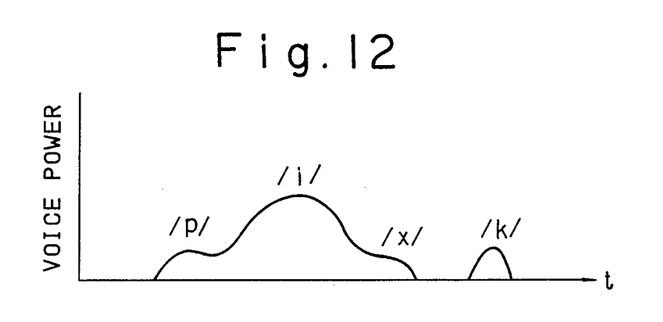
FIG. 12 is a schematic illustration showing the variation of voice power for word "pink" when pronounced as a function of time.

Described more in detail in this respect with reference to FIG. 12, the voice power pattern shown in FIG. 12 is for the word "pink." In FIG. 12, the ordinate is taken for voice power (energy) and the abscissa is taken for time. Thus, as the word "pink" is pronounced, its voice power level changes with time. The striking feature of such a word as "pink" which has an explosive sound at the end resides in the fact that the last sound element /k/ is isolated and rather short in duration. Thus, it is often the case that this last sound element /k/ is not clearly produced and thus lost. If the voiced sound for "pink" is registered in the voice recognition system under such circumstances, it may be that the word "pink" is registered as "pin" and not as "pink." A typical prior art approach to cope with this problem is to store both of "pink" and "pin"; however, such an approach is not advantageous because it requires a large capacity memory for storing reference data, and it is more so for the case of English because many words end with a consonant which is pronounced independently.

When an English word is pronounced according to the Japanese sounds, a vowel tends to be added at the end of the word. For example, if "pink" is pronounced according to the Japanese sounds, it would sound like "pinku" with the addition of "u" at the end. In this case, the explosive sound is not located at the end of a word, but it is located at the second sound element from the end of the word. It is thus believed that, in any language, there are some or many words which include one or more characters, which are difficult to be detected when pronounced, at the end or near the end of the word. Therefore, there has been a need to develop a technology which can rectify this problem and thus allows to store reference data at high accuracy.

SUMMARY OF THE INVENTION

In accordance with the principle of the present invention, there is provided a voice recognition system which includes a checking routine for checking whether or not an input voice signal contains all of the necessary information before being stored as a reference data. That is, the present voice recognition system includes a first input means for inputting an identification data identifying a corresponding sound data and a second input means for inputting a sound data. The system also includes a first checking means for checking whether or not the identification data thus input indicates the presence of a predetermined sound element which is difficult to detect. The system further includes a second checking means for checking the sound data to see if it contains all of required information only when the first checking means has indicated the presence of a predetermined sound element. The sound data having a predetermined sound element is stored as a reference data only when it has all of the necessary information.

In accordance with another aspect of the present invention, it is so structured to add a predetermined sound element, such as an explosive, to the sound data when it is registered as a reference data if the predetermined sound element has been found to be lacking at the time of registration.

In one embodiment, a phonetic or phonemic spelling of a selected word is input into a keyboard which constitutes the first input means, and, thus, the phonetic spelling, which is a string of characters or sound elements corresponding to the selected word, is converted into a string of codes each corresponding to each of the characters or sound elements. The second input means includes a microphone for inputting a voice or sound in the form of pressure waves for the selected word to produce a voice or sound signal in the form of electrical signal. The first checking means checks whether or not the selected word has one or more predetermined characters which produce a predetermined sound, such as a selected vowel or explosive, at a predetermined location. If affirmative, then the second checking means checks whether or not the voice signal has all of the expected information. If not, a request is made to reinput the sound data or a predetermined process is carried out to register the sound data as an accurate reference data.

It is therefore a primary object of the present invention to obviate the above-described disadvantages of the prior art and to provide an improved voice recognition system.

Another object of the present invention is to provide an improved voice recognition system having a significantly high recognition rate.

A further object of the present invention is to provide an improved voice recognition system which is insured to register reference voice data accurately.

A still further object of the present invention is to provide an improved voice recognition system high in performance and yet simple in structure.

Other objects, advantages and novel features of the present invention will become apparent from the following detailed description of the invention when considered in conjunction with the accompanying drawings.

DESCRIPTION OF THE PREFERRED EMBODIMENTS

Figure 2:
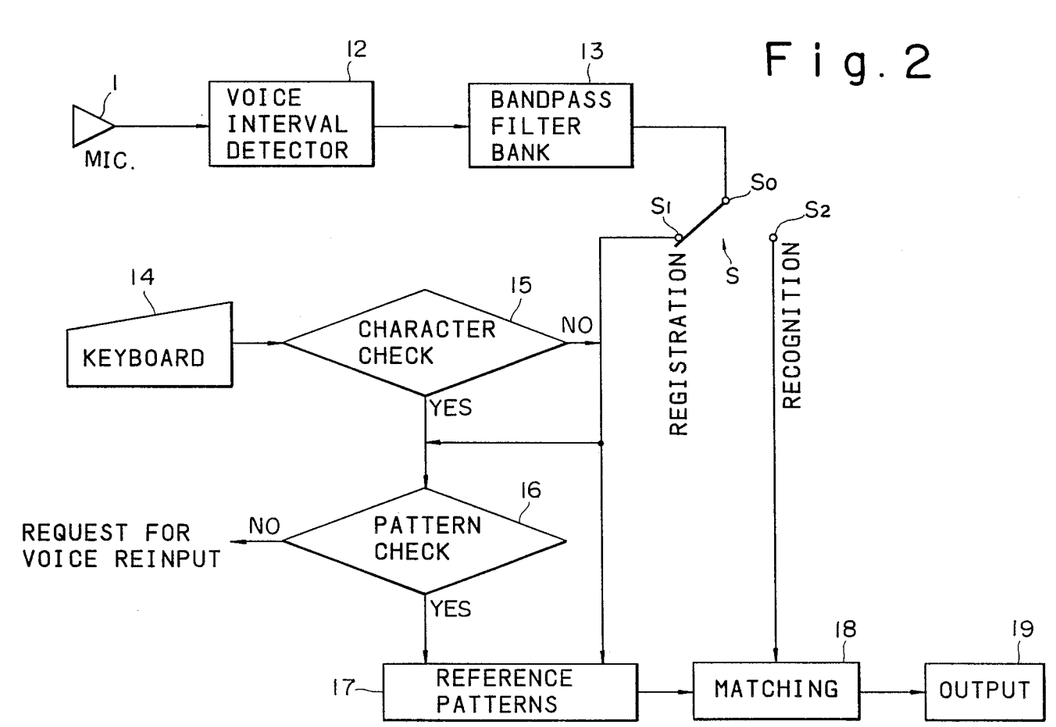
FIG. 2 is a schematic illustration showing partly in blocks the overall structure of a voice recognition system constructed in accordance with one embodiment of the present invention.

Referring now to FIG. 2, there is schematically shown a voice recognition system constructed in accordance with one embodiment of the present invention. As shown, the present voice recognition system includes a microphone 1 as an audio-electro transducer for receiving a voice or sound in the form of pressure waves and producing a corresponding sound signal in the form of an electrical signal as its output. Use may be made of a pick-up or any other devices in place of microphone 1, if desired, as long as it can convert a voice or sound data in the form of pressure waves into a voice or sound signal in the form of an electrical signal. The microphone 1 is connected to supply its output of voice signal to a voice interval detector 12, where the voice signal is separated from the noise signal and the duration or interval of the voice signal is determined.

Figure 8:
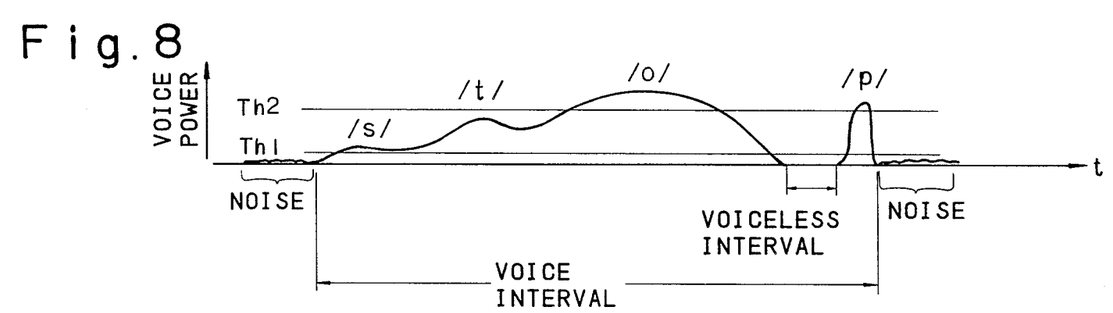
FIG. 8 is a schematic illustration which is useful for understanding the voice interval detecting operation which may be advantageously applied to the present invention.
Figure 9:
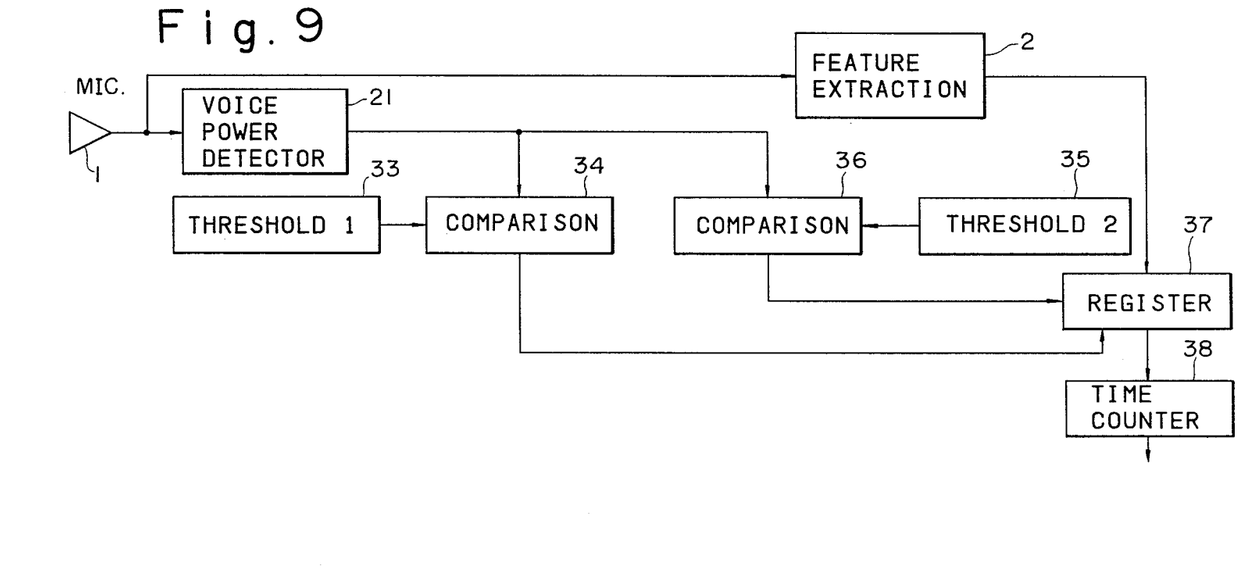
FIG. 9 is a schematic illustration showing partly in blocks the detailed structure of one example of a voice interval detection unit applicable to the present invention.

Referring to FIGS. 8 and 9, the structure and function of one example of the voice interval detector 12 will be described in detail. Let us suppose that the word "stop" has been pronounced and its sound has been input into the microphone 1. The sound is converted into the corresponding voice signal by the microphone 1 and the voice signal varies its power level depending on its sound elements /s/, /t/, /o/ and /p/ with time as shown in FIG. 8, in which the ordinate is taken for voice power level and the abscissa is taken for time. The voice signal shown in FIG. 8 is supplied to the voice interval detector 12 where only those information relating to the input sound "pink" is extracted while eliminating the background noise. As shown in FIG. 8, preferably, two power threshold levels, Th1 and Th2, are set. The lower threshold level Th1 is set at a level such that it is high enough to eliminate the background noise from the voice signal, but low enough to detect consonants in the voice signal. On the other hand, the upper threshold level Th2 is set at a level which is high enough to discriminate vowels from consonants in the voice signal. In the illustrated example, the lower threshold level Th1 is high enough to discriminate the voice signal from the noise and it is low enough to detect consonant portions /s/, /t/ and /p/ of the voice signal for "stop"; whereas, the upper threshold level Th2 is high enough to detect the vowel portion of /o/.

Thus, when the voice signal first crosses the lower threshold level Th1 upwardly, this point in time is set at the beginning of a voice interval. However, if the voice signal again crosses the lower threshold Th1 soon downwardly, it will be considered as a spike noise. Thus, the voice signal must remain above the lower threshold level Th1 over a predetermined minimum time period so as to be considered as a real voice signal. Since a word usually includes at least one vowel, the voice signal normally increases above the upper threshold level Th2, and, thereafter, if the voice signal decreases below the lower threshold Th1, then the duration between the time when the voice signal has increased above the lower threshold Th1 and the time when the voice signal has decreased below the lower threshold Th1 after crossing the upper threshold Th2 is determined as a voice interval. In the case of FIG. 8, the voice signal once returns to zero level after the vowel /o/, and there is provided a voiceless interval between sound elements /0/ and /p/. Such a voiceless interval is typically created in the voice signal in front of an explosive sound element, such as /p/, because the mouth is closed temporarily to be ready for creating the sound for /p/. Since such a voiceless interval is typically very short in time, 200-300 milliseconds at most, and located near the end of the voice signal, if the succeeding voice interval has occurred with a predetermined time period, this succeeding voice interval is integrated into the preceding time interval to define a single time interval, as shown in FIG. 8.

The detailed structure of one example of the voice interval detector 12 is shown in FIG. 9. As shown, there is provided a voice power detector 21 which is connected to receive an electrical signal from the microphone 1 and which supplies a voice power signal to a pair of comparators 34 and 36. The comparator 34 compares the voice power signal with the lower threshold Th1 set in a threshold unit 33 and the comparator 36 compares the voice power signal with the upper threshold Th2 set in a threshold unit 35. Both of the comparators 34 and 36 have their outputs coupled to a register 37 which has its output connected to a time counter 38. Also shown in FIG. 9 is a feature extractor 2, such as band pass filter bank, which is connected between the microphone 1 and the register 37.

With this structure, as a voice is input into the microphone 1, its converted electrical signal is supplied to the feature extractor 2 which then supplies an extracted feature, such as a time-frequency pattern, as its output to the register 37. At the same time, the converted electrical signal is also supplied to the voice power detector 21 and the detected voice power level is compared with the lower and upper threshold levels Th1 and Th2, respectively. When the voice power level has been found to exceed the lower threshold level Th1 for the first time, the extracted feature from the feature extractor 2 starts to be stored into the register 37. And, if the voice power level has been found to decrease below the lower threshold level Th1 without increasing above the upper threshold level Th2 at all, then the feature data thus far stored in the register 37 is cleared. On the other hand, if the voice power level has once increased above the upper threshold level Th2 and then decreased below the lower threshold level Th1, then the time when the voice power level has decreased below the lower threshold level Th1 is determined as the end of the voice interval. Upon determination of the end of the voice interval, the time counter 38 starts to count for a predetermined time period, e.g., 300 milliseconds, to see whether there is any succeeding voice interval within this predetermined time interval. If there is, in fact, a succeeding voice interval within the predetermined time interval, then this succeeding voice interval is combined with the preceding voice interval to define a single integrated voice interval having a voiceless interval, as shown in FIG. 8. In this manner, the extracted feature having information over a definite voice interval is stored in the register 37.

Returning to FIG. 2, the voice signal having a definite voice interval is then supplied to the band pass filter bank 13. The band pass filter bank 13 is one example of the feature extractor 2 shown in FIG. 1, and, for example, it includes a plurality of band pass filters different in band width. In one embodiment, the band pass filter bank includes 15 band pass filters having the lowest center frequency of 200 Hz and the highest center frequency of 6,200 Hz with an increment of ⅓ oct. Thus, as the voice signal is input into the band pass filter bank 13, there is obtained a time-frequency distribution pattern at the output of the bank 13. Although not shown, in one embodiment, a multiplexer is provided at the output of the bank 13 to scan the outputs of the plurality of band pass filters in sequence, so that there is obtained a timed sequence serial data of the time-frequency distribution pattern. In addition, an A/D converter is typically provided to convert the analog data from the multiplexer into digital data.

The output from the band pass filter bank 13 is supplied to a switch S which establishes either one of two modes of operation of the present system. That is, when the common contact $S_0$ of the switch S is connected to the contact $S_1$, the registration mode of operation is established; whereas, the recognition mode of operation is established with the common contact $S_0$ being connected to the other contact $S_2$. Since the contacts $S_0$ and $S_1$ are connected in FIG. 2, there is established the registration mode of operation. Under the condition, the voice signal in the form of serial digital data is supplied to a memory 17 for storage as a reference pattern. And, various voices may be input into the microphone one after another and stored into the memory 17 as reference data after processing through the elements 12 and 13 to create a library of reference patterns. Preferably, for registering one voice, the same voice is input more than once, e.g., three times, repetitively, and a plurality of voice signals thus created are averaged to define an average voice signal which in turn is stored in the memory 17 as a reference pattern. In this manner, there is created a library of registered voice patterns which is then used for identifying an unknown voice singal input into the present system.

That is, upon completion of creation of a library of registered voice patterns, the switch S is operated to establish a connection between the contacts $S_0$ and $S_2$. Under this condition, when an unknown voice is input into the microphone 1, an unknown voice pattern is produced at the output of the band pass filter bank 13 and supplied to a matching unit 18 where the unknown voice pattern is compared with each of the registered known voice patterns stored in the memory 17, thereby determining which of the registered voice patterns has the gratest similarity to the unknown voice pattern. In this manner, the identity of the unknown voice pattern is determined and supplied to an output unit 19.

The system shown in FIG. 2 has a character check unit 15 and a pattern check unit 16 which are provided in the registration section. The character check unit 15 is connected to receive a signal from a keyboard 14 and to control the flow of voice pattern data from the switch S to either the memory 17 or to the pattern check unit 16. The keyboard 14 is manually operated by the user and it feeds in the phonetic or phonemic spelling (identification information) of a word whose voice or sound is to be registered. For example, if it is desired to register the word "pink", then the spelling of "pink" is input using alphabetic keys of the keyboard 14. On the other hand, if the numeral "6" is desired to be registered, then the phonetic spelling of "roku" in the case of Japanese or "six" in the case of English is keyed in using the keyboard 14. Such a phonetic spelling is translated into a string of characters or codes which is then supplied to the character check unit 15, where it is examined whether or not the word or numeral thus input into the keyboard 14 contains a predetermined sound element when pronounced at a predetermined location. Typically, such a check is carried out to see whether the string of characters from the keyboard 14 contains one of predetermined characters, such as /u/, /i/, /n/, /p/, /t/, /k/, /b/, /c/, /d/, /ch/ and /ck/, at a predetermined location, i.e., as the end sound element or as the sound element next to the end sound element of the word.

If it has been found that the word input into the keyboard 14 contains one of these predetermined characters, a voice of that word is likely to lack information and thus its corresponding voice signal may be incomplete. Thus, if the word input into the keyboard 14 has been found to contain one of the predetermined characters, then the character check unit 15 functions such that its voice pattern obtained by processing through the elements 12 and 13 is not directly transferred to the memory 17. Instead, the voice pattern is routed from the bandpass filter 13 to the pattern check unit 16 via the switch S. At the pattern check unit 16, it is examined whether or not the voice pattern thus produced has a component corresponding to an expected characteristic of the corresponding one of the predetermined characters. For example, if the word input into the keyboard 14 ends with "u", then when a voice of this word is input into the microphone 1, the voice pattern is checked to see whether it has a pattern component for /u/ at the end. If not, there is issued a request for reinputting a voice into the microphone.

Figure 10:
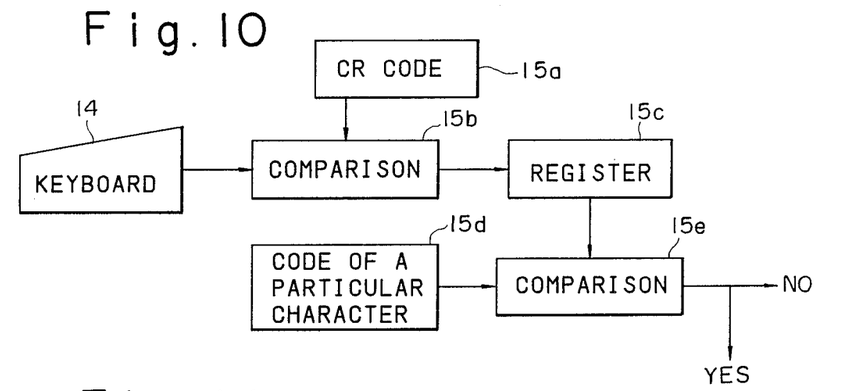
FIG. 10 is a schematic illustration showing in block diagram the detailed structure of one example for implementing the character check step 15 of the present invention.
Figure 11:
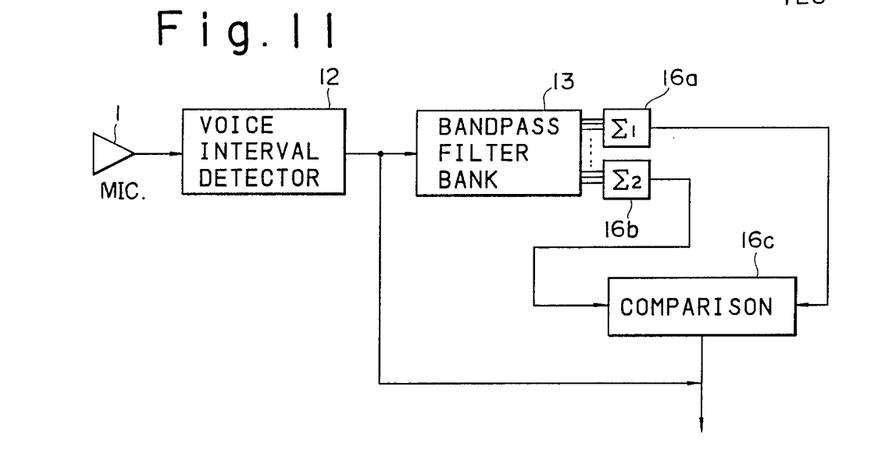
FIG. 11 is a schematic illustration showing in block diagram the detailed structure of one example for implementing the pattern check step 16 of the present invention.

The detailed structure of one example of the character check unit 15 is shown in block form in FIG. 10 and the detailed structure of one example of the pattern check unit 16 is schematically shown in FIG. 11. As shown in FIG. 10, when a character, forming part of a word, is input into the keyboard 14, its corresponding code is created, and, thus, a string of codes is formed corresponding to a string of characters defining a word and input into the keyboard 14, so that this string of codes is supplied to a comparator 15b one after another and then stored into a register 15c. At the register 15b, each time when a code is received from the keyboard 14, it is checked whether or not it is a carriage return (CR) code, indicating the end of the string of characters or word. If it has been found that the comparator 15b has received the carriage return code from the keyboard 14, then it is checked whether or not the last two codes of the code string correspond to one of the predetermined characters. Thus, a memory 15d contains codes which correspond to these predetermined characters which include /u/, /i/, /n/, /p/, /t/, ..., etc. A comparator 15e compares the last two codes of the character string now stored in the register 15c with each of the codes of these predetermined characters. If the word thus input into the keyboard 14 has been found to have no codes of these predetermined characters, then it proceeds to route NO so that the corresponding voice signal is supplied to the memory 17 directly.

On the other hand, if the word input into the keyboard 14 has found to contain one of the predetermined characters at a predetermined location, typically at the end or second from the end, then it proceeds to the pattern check unit 16. Under the circumstances, the corresponding voice signal is not supplied to the memory 17 directly; on the other hand, the corresponding voice signal is routed into the pattern check unit 16, where it is examined whether or not the corresponding voice signal does, in fact, have a sound element corresponding to the detected character. The pattern check unit 16 may take various forms; however, since the sound element /n/ has a particular frequency distribution, the pattern check unit 16 may take a particular structure for determining the presence of sound element /n/. Moreover, in the case of explosive sound elements, such as /p/, /t/, /k/, etc., since there is a voiceless interval in a voice interval near the end thereof, this fact may be used to construct the pattern check unit 16. It should also be noted that the checking functions of units 15 and 16 may also be provided by software.

FIG. 11 shows the detailed structure of the pattern check unit 16 for determining the presence of sound element /n/. In the case of the time-frequency pattern for the sound element /n/, the combined output of lower frequency components is much larger than the combined output of higher frequency components. In the case where use is made of the bandpass filter bank 13 having 15 different bans pass filters as described before, the presence of sound element /n/ can be determined by detecting the fact that the combined output of the bottom three bandpass filters having lower frequency ranges is larger than the combined output of the rest of the bandpass filters having higher frequency ranges. Therefore, as shown in FIG. 11, the output lines of the bottom three bandpass filters provided in the filter bank 13 are connected to a lower sum circuit 16b and the output lines of the other 12 bandpass filters are connected to an upper sum circuit 16a. The sum output from the upper sum circuit 16a is compared with the sum output from the lower sum circuit 16b at a comparator 16c, whereby the presence of sound element /n/ is determined if the sum output from the lower sum circuit 16b is found to be larger than the sum output from the upper sum circuit 16a. Here, since the presence of sound element /n/ is determined at the end of the voice signal, the voice end signal is supplied from the voice interval detector 12 to the output of the comparator 16c.

Figure 3:
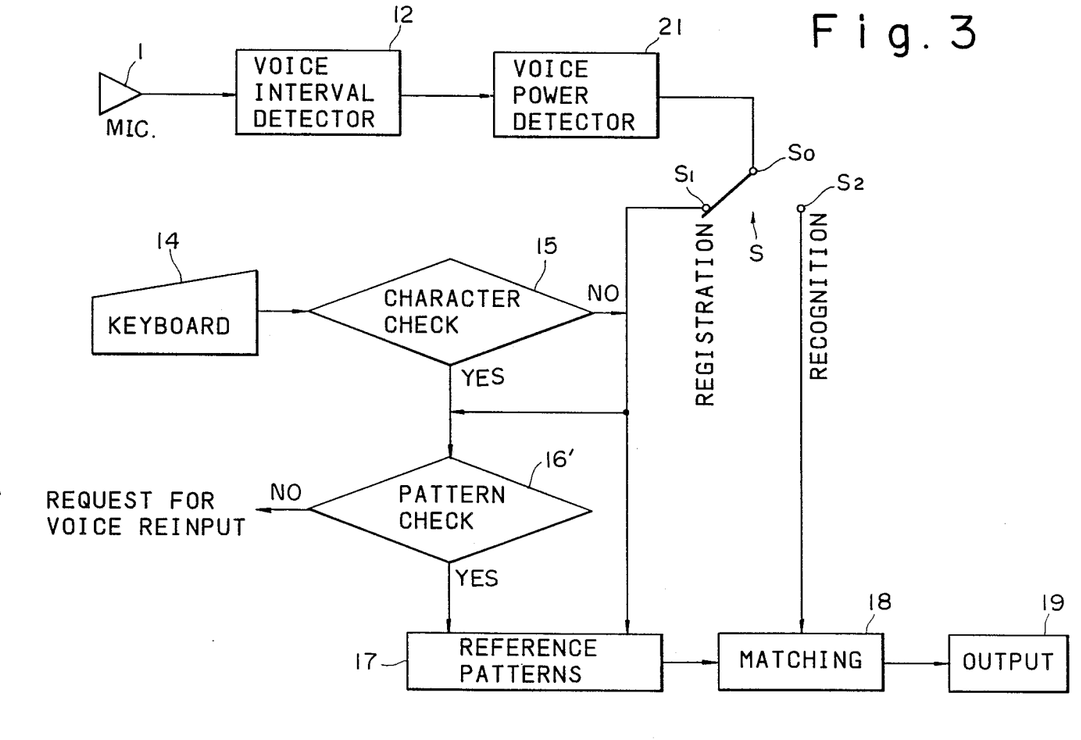
FIGS. 3 through 6 are schematic illustrations showing partly in blocks several modifications of the present invention.

Referring now to FIG. 3, there is schematically shown a voice recognition system constructed in accordance with another embodiment of the present invention. Since the present embodiment is similar in many respects to the previous embodiment shown in FIG. 2, like elements are indicated by like numerals, and the same description will not be repeated. In the system shown in FIG. 3, a voice power detector 21 is provided in place of the bandpass filter bank 13. The technique of using a voice power signal in voice recognition system is described in detail in the copending application, U.S. Ser. No. 06/908,681, filed Sept. 17, 1986, and assigned to the assignee of this application, which is hereby incorporated by reference. The voice power detector 21 may be easily constructed as a combination of the bandpass filter bank 13 and a power detector. Since the output from the voice power detector 21 is a voice power signal whose power level varies as a function of time, the pattern check unit 16' may differ in structure from the pattern check unit 16 of FIG. 2.

The operation of the system shown in FIG. 3 will be described when the word "pink" is to be registered. With the switch S establishing a connection between the contacts $S_0$ and $S_1$ as shown, the spell of "pink" is input through the keyboard 14. Since the word "pink" has an explosive sound element /k/ at the end, there will be a dip or voiceless interval between the sound element /n/ and /k/ as shown in FIG. 12. As the sound element /k/ is one of the predetermined characters, the character check unit 15 functions to route the output from the voice power detector 21 to the pattern check 16' and not directly to the reference data memory 17. Thus, when the voice of "pink" is input into the microphone 1, it is processed through the elements 12 and 21 and the corresponding voice power signal is routed to the pattern check unit 16', where the voice power signal is examined whether or not it has a power dip or voiceless interval near the end thereof. If it has been found that there is no power dip near the end of the voice power signal, then a request for reinputting the voice of "pink" is supplied. On the other hand, if the voice power signal has been found to possess a power dip or voiceless interval near the end thereof, then the voice power signal is supplied to the reference data memory 17 for storage therein. In this manner, it is insured that only accurate voice power signals are registered in the memory 17 as reference data.

Figure 4:
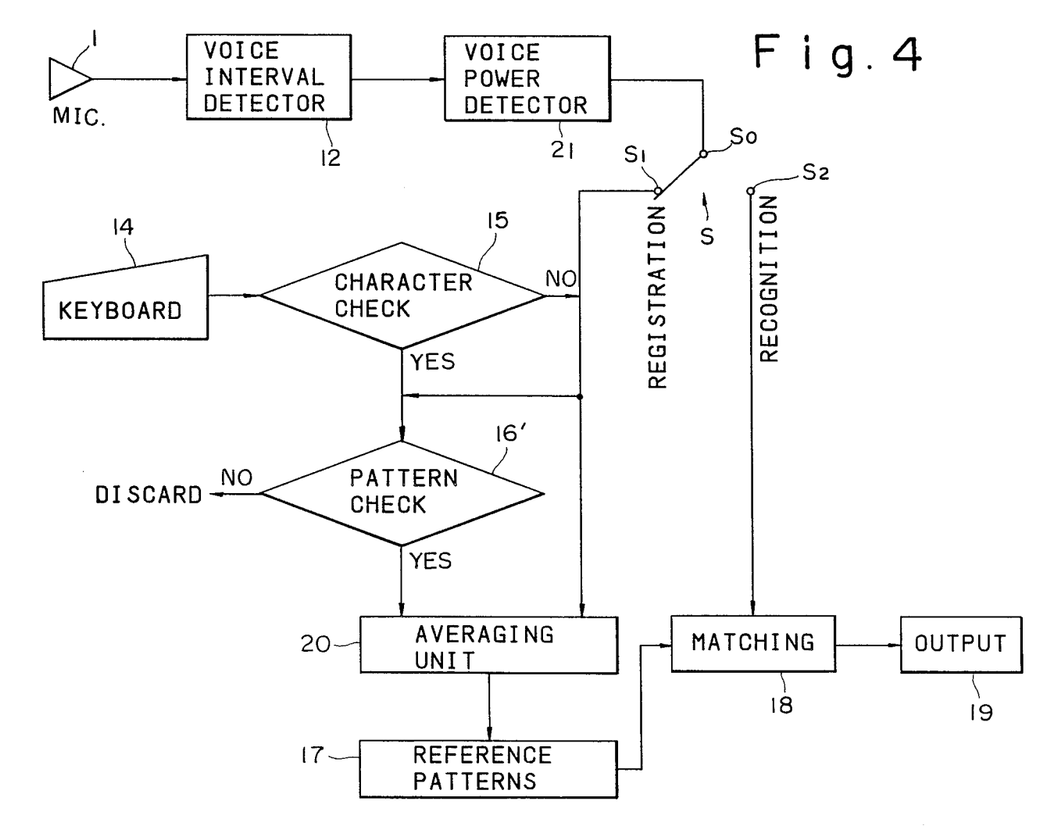

FIG. 4 is a modification of the structure shown in FIG. 3 and it differs structurally from the embodiment of FIG. 3 only in the additional provision of an averaging unit 20. Thus, it is to be noted that like numerals indicate like elements between FIGS. 3 and 4. In this embodiment, the same word is pronounced more than once and the corresponding voice is input more than once. Thus, there are produced a plurality of voice power signals which are averaged, for example by superposition, to define an average voice power signal, which, in turn, is stored in the reference pattern memory 17 if the conditions at units 15 and/or 16 are satisfied. In the embodiment of FIG. 4, if the voice power signal has been found to have no power dip or voiceless interval near the end thereof, then this incomplete voice power pattern is discarded by the pattern check unit 16'.

Figure 5:
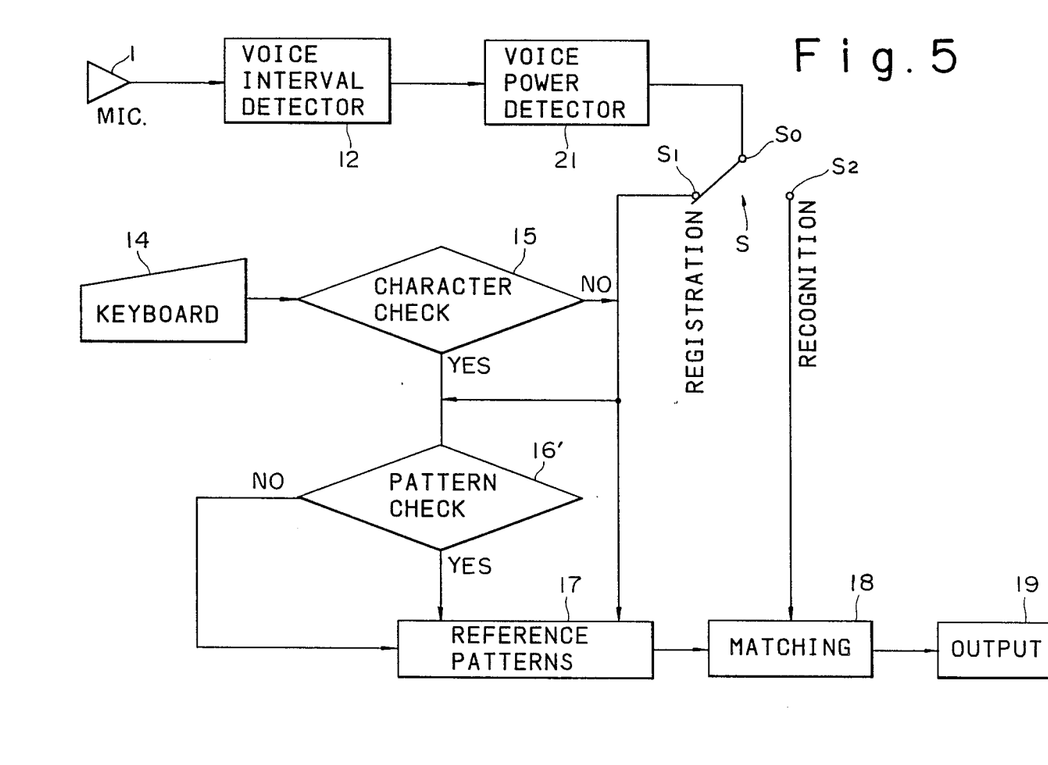
Figures 6, 7A, 7B:
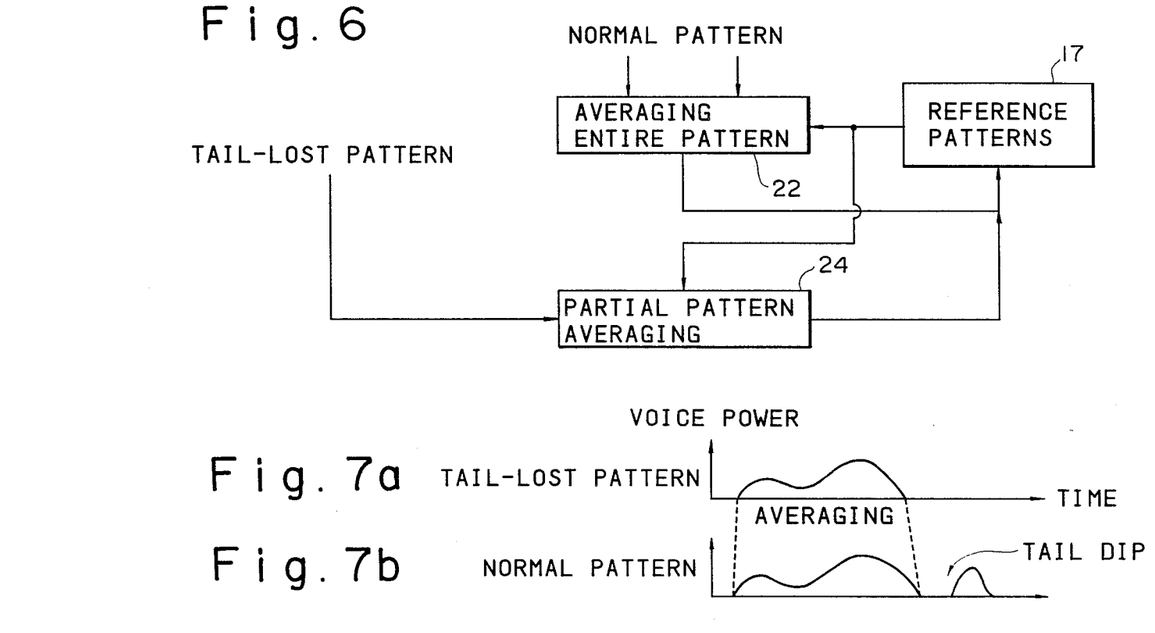
FIGS. 7a through 7c are schematic illustrations which are useful for understanding the averaging process which is advantageously applied to the system shown in FIG. 5.
Figure 7C:
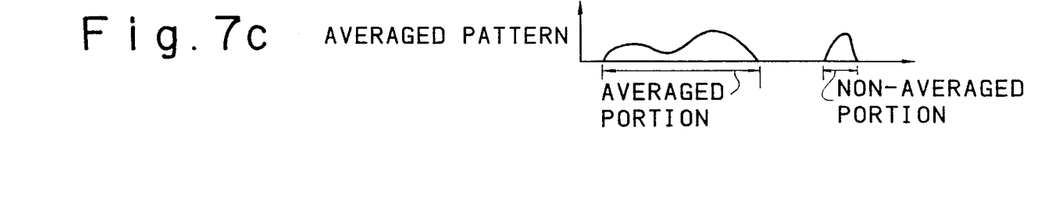

FIG. 5 shows a further modification of the present invention, and this embodiment is similar to those embodiments shown in FIGS. 3 and 4 so that like elements are indicated by like numerals. In the present embodiment, even if it has been found that the voice power signal does not have a power dip or voiceless interval near the end thereof, this voice power signal lacking a tail end is not discarded, but used for averaging. For this purpose, the averaging structure shown in FIG. 6 may preferably be provided between the reference pattern memory 17 and the pattern check 16'. If the voice power pattern has been found to have a power dip near the end thereof, it has a normal voice power pattern as shown in FIG. 7b. On the other hand, if the voice power signal has been found to have no power dip near the end thereof, it has a pattern shown in FIG. 7a, which lacks the expected power dip. Under the circumstances, in accordance with this embodiment, the averaging operation is carried out only between the components before the power dip. The resulting voice power signal is shown in FIG. 7c and it includes an averaged portion which is located before the power dip and a non-averaged portion which corresponds to the tail portion after the power dip in the normal signal shown in FIG. 7b. In this case, all of the voice power signals are used, thereby allowing to increase the efficiency of operation. As a further alternative, the embodiment of FIG. 5 may be so structured that the pattern check unit 16' issues a request of reinput until there is obtained a complete voice power signal for the first time.

Figure 13:
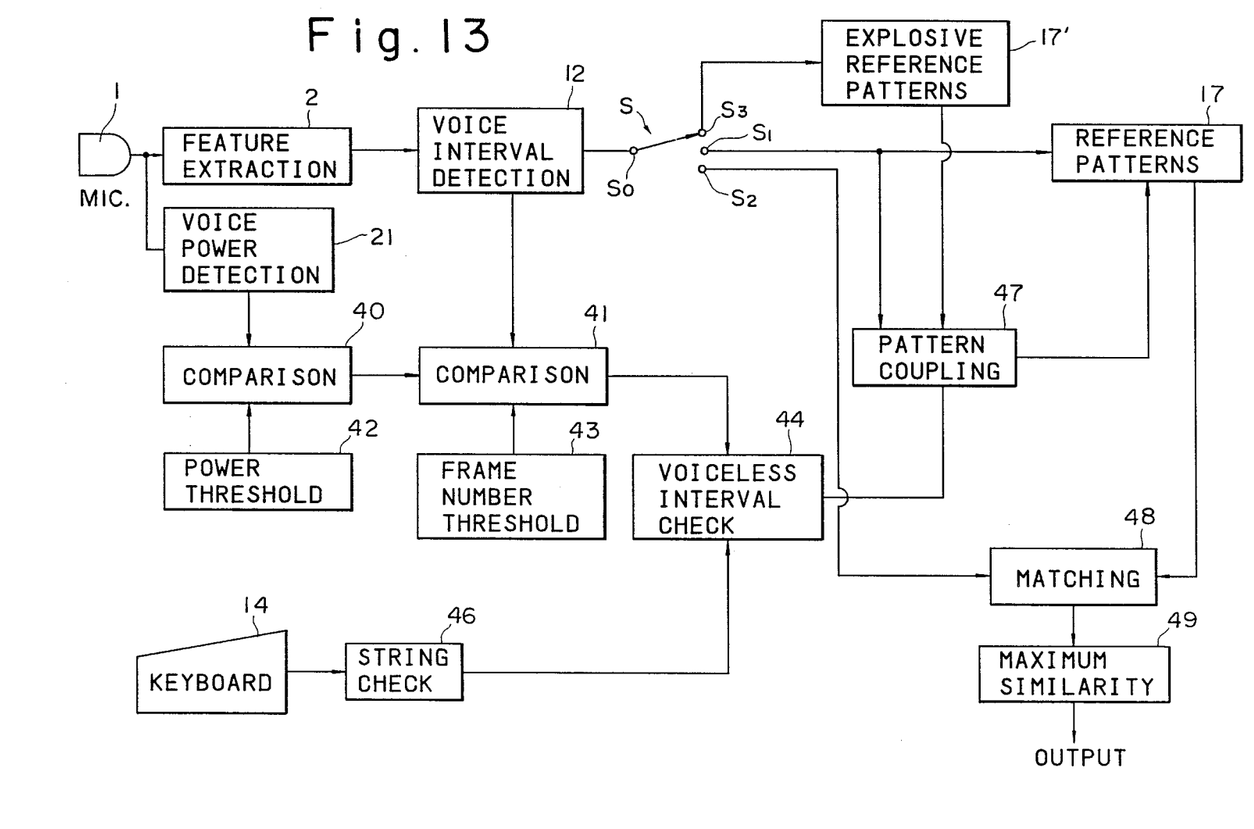
FIG. 13 is a schematic illustration showing partly in blocks the overall structure of a voice recognition system constructed in accordance with another embodiment of the present invention.

FIG. 13 shows a still further embodiment of the present invention, in which an incomplete voice signal is completed based on the information supplied from a keyboard before being stored as a reference pattern data. The voice recognition system of FIG. 13 includes a microphone 1 which is connected to a feature extractor 2 and also to a voice power detector 21. The feature extractor 2 may include a bandpass filter bank as explained with reference to FIG. 2, if the feature to be extracted is a time-frequency pattern. The extracted feature is supplied to a voice interval detector 12 which is connected to a switch S having a common contact $S_0$, a contact $S_1$ for establishing the normal registration mode, a contact $S_2$ for establishing the recognition mode, and a contact $S_3$ for establishing the explosive registration mode. The contact $S_1$ is connected to a reference pattern memory 17 and the contact $S_3$ is connected to an explosive pattern memory 17' which may be constructed by a part of the memory 17. The contact $S_2$, on the other hand, is connected to a matching unit 48 which is also connected to receive data from the reference pattern memory 17, so that, during the recognition mode, the unknown voice pattern is compared, e.g., by DP matching scheme, with each of the reference voice patterns stored in the memory 17 at the matching unit 48 and the one of the reference patterns having the largest similarity is selected by a maximum similarity unit 49 and supplied as an output.

On the other hand, the explosive pattern memory 17' stores voice patterns of explosive sound elements, such as /p/, /t/ and /k/, which are normally difficult to detect, as explosive reference patterns. As will be described more fully later, under predetermined conditions, one of the explosive reference patterns is selected and supplied from the explosive reference pattern memory 17' to a pattern coupling unit 47, where an incomplete voice pattern lacking an explosive pattern is completed by coupling and the completed voice pattern is then stored into the reference voice pattern memory 17.

The voice power detector 21 is connected to a comparator 40 where the power level of the voice signal is compared with a power threshold set in a power threshold unit 42. Also provided is another comparator 41 which receives information from the voice interval detector 12 to determine where in the voice signal that portion which is lower than the power threshold set at the power threshold unit 42 is located and to determine whether or not that portion is located closer to the end of the voice signal as compared with the location set in a frame number threshold unit 43. The comparator 41 is connected to a voiceless interval check unit 44. A keyboard 14 is connected to a string check unit 46 which is connected to the voiceless interval check unit 44. Thus, when a collection of selected characters, such as a word, is input through the keyboard 14, there is obtained a string of codes which is then processed by the string check unit 46 to determine whether or not the input word has an explosive sound element, such as /k/ in the word "pink", at the end of the string. If the string check unit 46 has found the presence of an explosive sound element at the end of the string, then it supplies a signal to the voiceless interval check unit 44 so that the voiceless interval check unit 44 examines whether or not an expected voiceless interval is present in the voice signal near the end thereof.

In this manner, whether or not an explosive sound element is present at the end of a word to be registered is determined by the phonetic spelling of the word to be registered; on the other hand, whether or not the corresponding voice signal has a component of the corresponding explosive sound element is determined by the presence or absence of a voiceless interval near the end of the voice signal. In accordance with the present embodiment, if it has been found that the corresponding voice signal does not have an expected voiceless interval near the end thereof, it is considered that the consonant at the end of the word has been lost and an appropriate explosive sound element is retrieved from an explosive reference pattern memory and coupled to the incomplete voice signal to form a complete voice signal.

Described more in detail, the user first operates the switch S to establish a connection between contacts $S_0$ and $S_3$ so that the explosive registration mode is established. Under the condition, desired explosive sound elements, such as /p/, /t/ and /k/, are produced and their corresponding patterns are stored in the explosive reference pattern memory 17'. If it is difficult to pronounce these explosive sound elements, words including these explosive sound elements, such as "stop" for /p/, "hat" for /t/ and "pink" for /k/, may be pronounced to generate corresponding voice patterns which are then processed to form desired patterns by eliminating the rest excepting the end portion of the voice signals. In this manner, voice patterns of explosive sound elements may be stored in the explosive reference memory 17'.

Thereafter, the switch S is operated to establish a connection between contacts $S_0$ and $S_1$ so that the common registration mode is established. Under the condition, a word to be registered is input through the keyboard 14 according to its phonetic spelling. At the same time, the user pronounces the word to be registered and its sound or voice is input through the microphone 1. If the word thus input has been found to have no explosive sound element by the string check unit 46, then the corresponding voice signal is directly stored into the common reference pattern memory 17. On the other hand, if the string check unit 46 has found that the phonetic spelling of the word to be registered does include an explosive sound at the end thereof, then the voice signal output from the comparator 41 is checked by the voiceless interval check unit 44 to determine whether or not the outputting voice signal has a voiceless interval near the end thereof. In the case where the voice signal has been found to lack a voiceless interval near the end thereof, though the string check unit 46 has indicated the presence of such a voiceless interval, then a signal is supplied from the voiceless interval check unit 44 to the pattern coupling unit 47, whereby the voice pattern of the corresponding explosive sound element is taken out of the explosive reference pattern memory and combined with the voice pattern from the voice interval detector 12 through the switch S before being stored into the common reference pattern memory 17. In this instance, preferably, a voiceless interval of an appropriate length is inserted between the voice pattern and the explosive pattern. In this manner, in accordance with this embodiment, even if the produced voice pattern or signal is incomplete in lacking an explosive component at the end thereof, it can be suitably completed by selecting one of a plurality of stored explosive patterns and having it combined with the incomplete voice pattern. Accordingly, the produced voice pattern is less wasted and there is obtained an enhanced efficiency.

Upon completion of registration of desired words or collections of characters and numerals, the switch S is again operated to have the contact $S_0$ connected to the contact $S_2$ to establish the recognition mode of operation. Under this condition, when an unknown voice is input into the microphone, its corresponding voice pattern is produced and supplied to the matching unit 48 to be compared with each of the registered voice patterns in the memory 17. As a result, one of the registered reference patterns having the maximum similarity to the unknown voice pattern is selected and output as a recognized result.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A voice recognition system comprising:
   first input means for inputting a voice in the form of pressure waves and converting said voice into an electrical signal;
   processing means for processing said electrical signal to produce a voice pattern of a predetermined format;
   second input means for inputting an identification information of said voice;
   storing means for storing said voice pattern as a reference pattern selectively; and
   checking means for checking said identification information to determine whether or not said voice has a predetermined sound element at or near the end thereof, thereby causing said voice pattern to be stored in said storing means if said voice has been found to have no predetermined sound element and then to check said voice pattern to determine whether or not said voice pattern has a corresponding component of said predetermined sound element if said voice has been found to have said predetermined sound element.

2. The system of claim 1 wherein said checking means issues a request of reinputting said voice into said first input means if said voice pattern has been found to have no corresponding component of said predetermined sound element.

3. The system of claim 1 further comprising averaging means for averaging a plurality of said voice patterns to define an average voice pattern before being stored into said storing means.

4. The system of claim 1 wherein said predetermined sound element is a selected vowel.

5. The system of claim 4 wherein said selected vowel is /u/ or /i/.

6. The system of claim 1 wherein said predetermined sound element is an explosive.

7. The system of claim 1 wherein said first input means includes an audio-electro transducer for converting a voice in the form of pressure waves into an electrical signal.

8. The system of claim 7 wherein said transducer is a microphone.

9. The system of claim 1 wherein said second input means includes a keyboard and said identification information is a phonetic spelling of said voice, whereby said keyboard converts said phonetic spelling into a string of codes.

10. The system of claim 9 wherein said checking means receives said string of codes to determine the presence or absence of said predetermined sound element in said voice.

11. The system of claim 1 further comprising:
selecting means for selecting a registration mode or a recognition mode; and
matching means for matching said voice pattern with each of said reference patterns stored in said storing means while keeping said checking means inoperative during said recognition mode, whereby one of said reference patterns which is most similar to said voice pattern is selected as an output.

12. A voice recognition system comprising:
first input means for inputting a voice in the form of pressure waves and converting said voice into an electrical signal;
processing means for processing said electrical signal to produce a voice pattern of a predetermined format;
second input means for inputting an identification information of said voice;
first storing means for storing said voice pattern as a reference pattern selectively;
second storing means for storing at least one explosive voice pattern;
checking means for checking said identification information to determine whether or not said voice has a voiceless interval near the end thereof and if so to determine whether or not said voice pattern has said voiceless interval near the end thereof; and
coupling means for coupling said voice pattern with a corresponding explosive voice pattern stored in said second storing means to define a complete voice pattern before being stored in said first storing means as a reference pattern.

13. The system of claim 12 wherein said corresponding explosive voice pattern is combined with said voice pattern with a predetermined gap therebetween.

14. The system of claim 12 wherein said first input means includes an audio-electro transducer.

15. The system of claim 14 wherein said audio-electro transducer is a microphone.

16. The system of claim 12 wherein said second input means includes a keyboard and said identification information is a phonetic spelling of said voice.

17. The system of claim 12 further comprising:
selecting means for selecting one of a first and second registration modes and a recognition mode, said selecting means causing said processing means and said second storing means to be connected to said coupling means when said first registration mode is established and causing said processing means to be connected to said second storing means when said second registration mode is established;
matching means for matching said voice pattern with each of said reference patterns stored in said first storing means while keeping said checking means inoperative during said recognition mode; and
means for determining which of said reference patterns in said first storing means is most similar to said voice pattern.

* * * * *